(No Model.)

G. F. OTT.
Pipe Coupling.

No. 236,957. Patented Jan. 25, 1881.

Attest
H. L. Perrine

Inventor.
George F. Ott
by his attorneys
Betts & Doolittle

UNITED STATES PATENT OFFICE.

GEORGE F. OTT, OF PHILADELPHIA, PENNSYLVANIA.

PIPE-COUPLING.

SPECIFICATION forming part of Letters Patent No. 236,957, dated January 25, 1881.

Application filed September 1, 1880. (No model.)

*To all whom it may concern:*

Be it known that I, GEORGE F. OTT, a citizen of Switzerland, residing at Philadelphia, in the county of Philadelphia and State of Pennsylvania, have invented certain new and useful Improvements in Pipe-Couplings; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.
This invention is intended to be applied to flangeless thin metal pipes, such as the ordinary welded iron, gas, and water pipes which are of even exterior diameter throughout, so as to terminate in thin-walled ends. It is more especially designed to be used in connection with or on pipes or tubes for conveying ammonia and other liquefiable gases and vapors of volatile liquids used for refrigerating purposes, but may be used on pipes for conveying other fluids.

The object of the invention is to make a gas-tight joint by the direct application of a packing between the pipes, and in such a way that the packing, on being compressed, cannot escape either outwardly from between or inwardly into the pipes.

To this end the invention consists in compressing a packing, preferably lead, between the pipes, the packing being internally sustained around an unyielding sleeve composed either of the reduced end of one of the pipes fitting a corresponding socket in the end of the other pipe, or of a separate thimble fitted in sockets formed in the pipe ends to be joined.
In order that my invention may be clearly understood, I have illustrated in the annexed drawings, and will proceed to describe, two of the best forms at present known to me.

Figure 1:
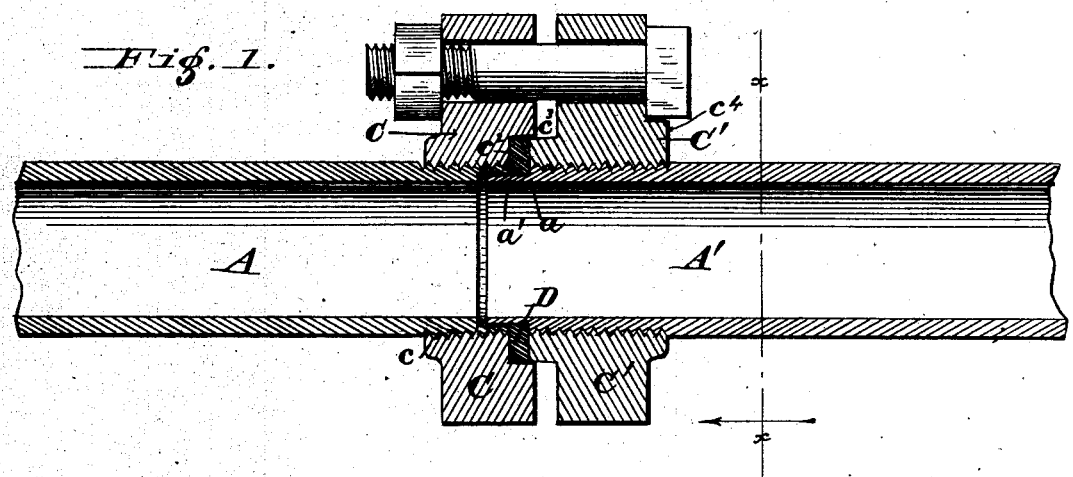
Figure 2:
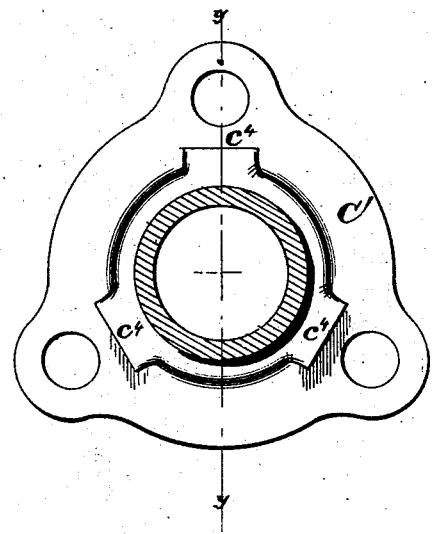
Figure 3:
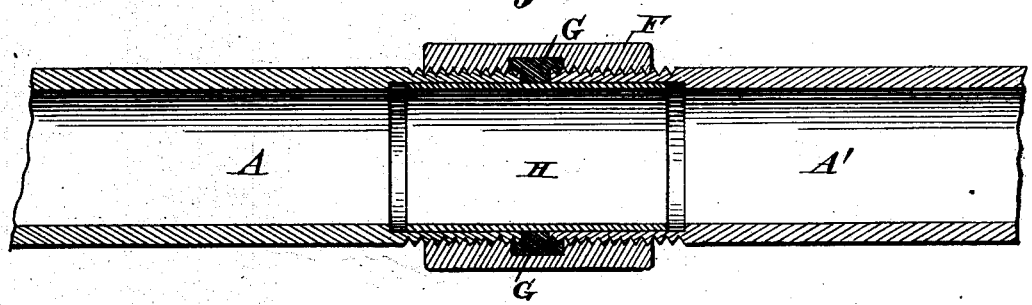

Figure 1 is an axial section, full size, of one form of my improved pipe-joint. Fig. 2 is a rear elevation of one of the flanges shown in Fig. 1. Fig. 3 is an axial section, full size, of another form of my invention applied to one-inch iron pipes.
The pipes A and A' are screw-threaded externally, to receive and hold the means used for the twofold purpose of coupling them and of drawing them together to compress the packing D between them.

As shown in Fig. 1, the coupling consists of two flanges, C and C', constructed with internally screw-threaded hubs $c$ and $c'$ and screwed on the respective pipes. The flange C has a circular rabbet, $c^2$, in its face around its screw-threaded hole, while the flange C' has a corresponding ring-rib, $c^3$, on its face. The flange C is screwed so far on the pipe A that the end of the latter is flush with the bottom of the rabbet $c^2$ in the former, and the end of pipe A is bored out for some distance to form a shallow socket therein. The end of pipe A' is reduced to snugly fit the socket of pipe A, and the flange C' is so far screwed on pipe A' that the outer edge of its ring-rib $c^3$ is flush with the shoulder $a$, formed by the reduction of the end of this pipe. This reduced end constitutes a sleeve, $a'$. The flanges are provided with bolt-holes, and one of them has on its back bosses $c^4$, terminating with a straight edge near the bolt-holes, and adapted to engage the bolt-heads and prevent the bolts from turning when the nuts are being screwed up.

In joining the pipes by this coupling a packing-ring, D, of lead or other suitable material, is first placed in the rabbet $c^2$. The packing should be wide enough to lap the edge of pipe A. The pipe A' is then moved up and its sleeve pushed through the packing-ring into the socket of pipe A, to force the ring-rib $c^3$ against the packing. The pipes, with their flanges, are then drawn together by bolts and nuts to compress the packing, which will tightly close the joint between the sleeve of pipe A' and the socket of pipe A without entering either pipe.

Fig. 3 shows the pipes coupled by a right and left screw-threaded nipple, F, the central cavity of which contains the packing-ring G, which is cast or placed in it before the nipple is applied. The ends of both pipes are bored out, and a separate thimble, H, is fitted in the sockets thus formed. In this case the pipes are drawn together by the nipple and their ends forced against or into the packing to close the joints between the thimble and the pipe sockets. The internal diameter of the thimble should be about the same as the internal diameter of the pipes, so that there may be no material contraction at the joint.

It will be observed that in both examples of the invention the packing, when the joint is completed, is confined under pressure by the coupling means, so that it cannot escape outwardly from between the pipes any more than inwardly into the pipes.

I am aware that pipe-joints have been made in which a packing-ring interiorly sustained was confined under pressure by the coupling means; but in every instance at least one of the pipe ends was specially constructed and exteriorly enlarged to make the joint practicable. My invention differs from the above in that my joint is applicable to the ordinary gas and water pipes of even exterior diameter throughout.

Having thus described my invention, what I claim as new is—

The combination, substantially as before set forth, of two pipes, separate means attached thereto for coupling them, a packing-ring confined, under pressure, between the pipes, overlapping the joints between said coupling means and pipes, and a sleeve or thimble extending from one pipe into the other through the packing-ring.

In testimony whereof I affix my signature in presence of two witnesses.

GEORGE F. OTT.

Witnesses:
LOUIS J. BAUER,
E. F. OTT.